Patented Sept. 19, 1950

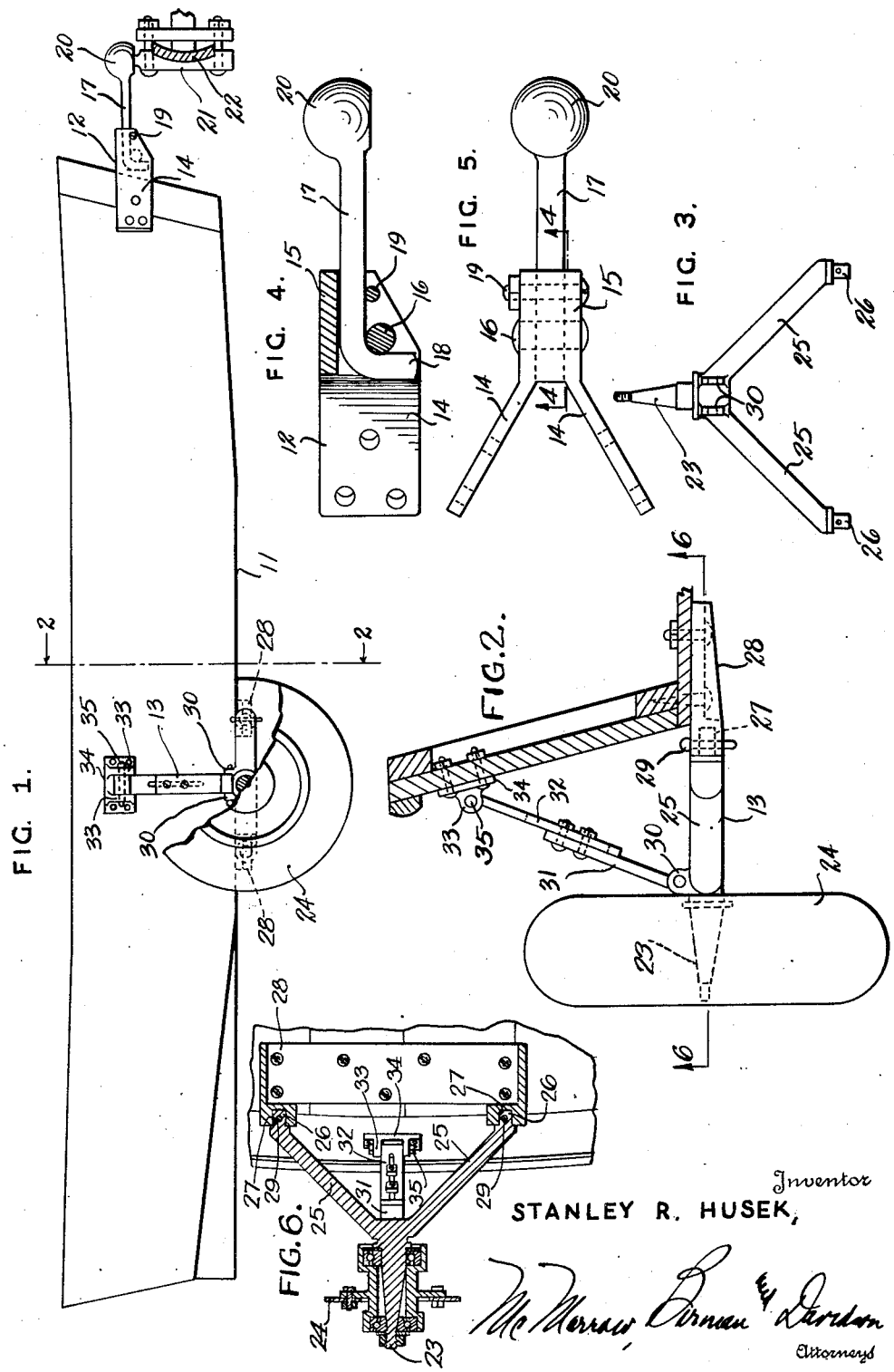

2,522,616

UNITED STATES PATENT OFFICE 2,522,616

BOAT TRAILER ATTACHMENT

Stanley R. Husek, Watervliet, Mich.

Application February 19, 1946, Serial No. 648,598

2 Claims. (Cl. 280—61)

This invention relates to boats and more particularly to structure for adapting a boat to be used as a trailer for an automobile.

A main object of the invention is to provide novel and improved adapter means for adapting a boat to be used as an automobile trailer, said adapter means being very simple in structure, easy to install and very inexpensive to manufacture.

A further object of the invention is to provide an improved adapter means for boats, said adapter means being readily attachable and removable and including road wheels to facilitate the rapid transportation of a boat over land by attachment to the rear portion of an automobile.

Further objects and advantages of the invention will become apparent from the following description and claims, and from the accompanying drawings, wherein:

Figure 1 is a side elevational view of a boat equipped with trailer adapter means constructed in accordance with the present invention.

Figure 2 is a fragmentary vertical cross-sectional view taken on line 2—2 of Figure 1.

Figure 3 is a top plan view of an axle supporting member employed in the boat trailer adapter means of Figure 1.

Figure 4 is an enlarged vertical longitudinal section of the hitch member taken on the line 4—4 of Figure 5.

Figure 5 is a top plan view of the hitching member of Figure 4.

Figure 6 is a horizontal section taken on the line 6—6 of Figure 2.

Referring to the drawings, 11 designates a boat of the conventional type. The trailer adapter structure comprises a hitch member 12 for connecting the bow of boat 11 to an automobile and road wheel members 13 detachably secured to boat 11 at each side thereof to support the boat for overland transportation.

The hitch member 12 comprises a bracket member having divergent plate portions 14, 14 and an inverted U-shaped junction portion 15 through which passes a fixed transverse bolt member 16. Plate portions 14, 14 are adapted to be secured to the convergent surfaces of the bow portion of boat 11. A hook member 17 formed at one end with a downturned arm 18 is adapted to be engaged in junction portion 15 with arm 18 positioned behind bolt 16, said hook member being locked in this position by a removable transverse bolt 19 passing through said junction portion and underlying hook member 17. The other end of hook member 17 is formed with a socket portion 20 adapted to receive a ball carried by a vertical bolt member 21 clamped to the rear bumper 22 of an automobile. This provides a hitch structure for boat 11.

Each road wheel member 13 comprises an axle element 23, upon which a road wheel 24 is adapted to be journalled, said axle being integrally secured to a pair of divergent arms 25, 25. Each arm 25 is formed at its end with a lug portion 26. The lug portions 26, 26 are adapted to be received in respective recesses 27 provided therefor in a plate member 28 secured to the underside of boat 11, said lug portions being secured in their recesses by respective removable vertical headed pins 29 passing through the laterally projecting ends of the plate members and through the respective lug portions 26. Adjacent axle 23 portion 13 is formed with a pair of parallel lugs 30, 30 between which is pivotally secured a brace arm section 31. Secured to brace arm section 31 and longitudinally adjustable with respect thereto is a second brace arm section 32 pivotally secured at its upper end between a pair of lugs 33, 33 formed on a bracket member 34 secured to the side of boat 11. A removable pin 35 passing through lugs 33, 33 and said upper end of brace arm section 32 provides the required securement of said upper end to the lugs 33, 33.

When the parts are arranged as shown in Figures 1 and 2 boat 11 may be towed behind the automobile to any desired shore side location. When it is desired to launch boat 11, pins 35 and 29 and bolt 19 are removed, allowing the road wheel members 13 to be detached from the boat and allowing hook member 17 to be disengaged from forward portion 12. If desired plate members 28 and forward portion 12 may also be detached from boat 11. To prepare the boat 11 for overland transportation as a trailer the reverse procedure is followed.

While a specific embodiment of a trailer adapter structure for a boat has been disclosed in the foregoing description, it will be understood that various modifications within the spirit of the invention may occur to those skilled in the art. Therefore it is intended that no limitations be placed on the invention other than as defined by the scope of the appended claims.

What is claimed is:

1. Apparatus for transporting a boat or the like over land comprising a plate member adapted to extend horizontally beneath the boat and to be removably secured to the underside thereof, an axle member including a wheel-bearing part and a pair of divergent arms integral with said wheel-bearing part, a wheel journaled on said wheel-bearing part, said plate member being provided with a pair of recesses therein and each of said arms being provided with a lug receivable in each of said recesses respectively, means releasably securing said lugs in said recesses, said axle member being provided with a pair of spaced parallel lugs adjacent said wheel-bearing part, a brace arm section having its lower end portion pivoted between said spaced parallel lugs of said axle member, a second brace arm section longitudinally adjustably secured relative to the upper end portion of the first-named brace arm section, a bracket member adapted to be secured to the side wall of the boat, and a pair of spaced ears extending outwardly from said bracket, and releasable pivot means holding the upper end portion of the second brace arm section between said ears.

2. Apparatus for transporting a boat or the like over land comprising a plate adapted to be secured to the underside of the boat or the like, said plate being formed with a pair of sockets spaced lengthwise of the boat or the like, an axle member comprising an axle having a ground engaging wheel journalled thereon and a pair of lugs removably inserted in said sockets, retaining means removably securing said lugs in place in said sockets, a diagonal brace comprising a lower element pivoted at its lower end to said axle member and an upper element secured to said lower element for vertical adjustment relative thereto, a bracket adapted to be secured to the side of the boat above said axle member, and pivot means securing the upper end of said upper brace element pivotally and removably to said bracket.

STANLEY R. HUSEK.

REFERENCES CITED

The following references are of record in the file of this patent:

UNITED STATES PATENTS

| Number | Name | Date |
|---|---|---|
| 1,376,496 | Woodruff | May 3, 1921 |
| 2,099,549 | Watson | Nov. 16, 1937 |
| 2,235,034 | Molloy et al. | Mar. 18, 1941 |
| 2,339,782 | Johnson | Jan. 25, 1944 |
| 2,410,570 | Davis | Nov. 5, 1946 |
| 2,424,641 | Swanson | July 29, 1947 |
| 2,437,736 | Good | Mar. 16, 1948 |